April 14, 1931. H. BERNIER 1,800,336
METHOD OF REMOVING OIL FROM OLIVES AND OTHER FRUITS
Filed June 1, 1921 2 Sheets-Sheet 2
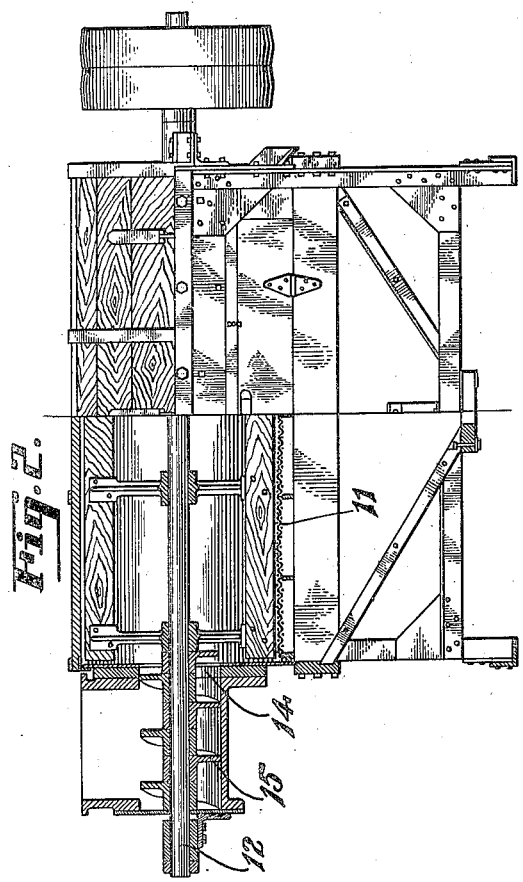
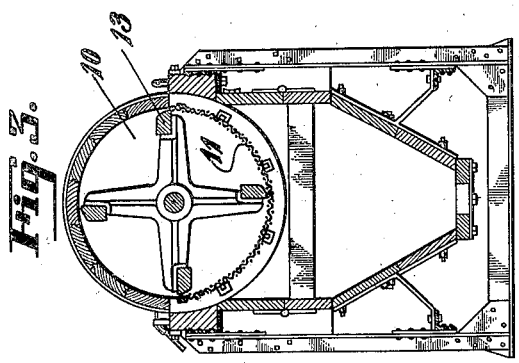
INVENTOR
HENRI BERNIER
BY Chas. E. Townsend
ATTORNEY Patented Apr. 14, 1931

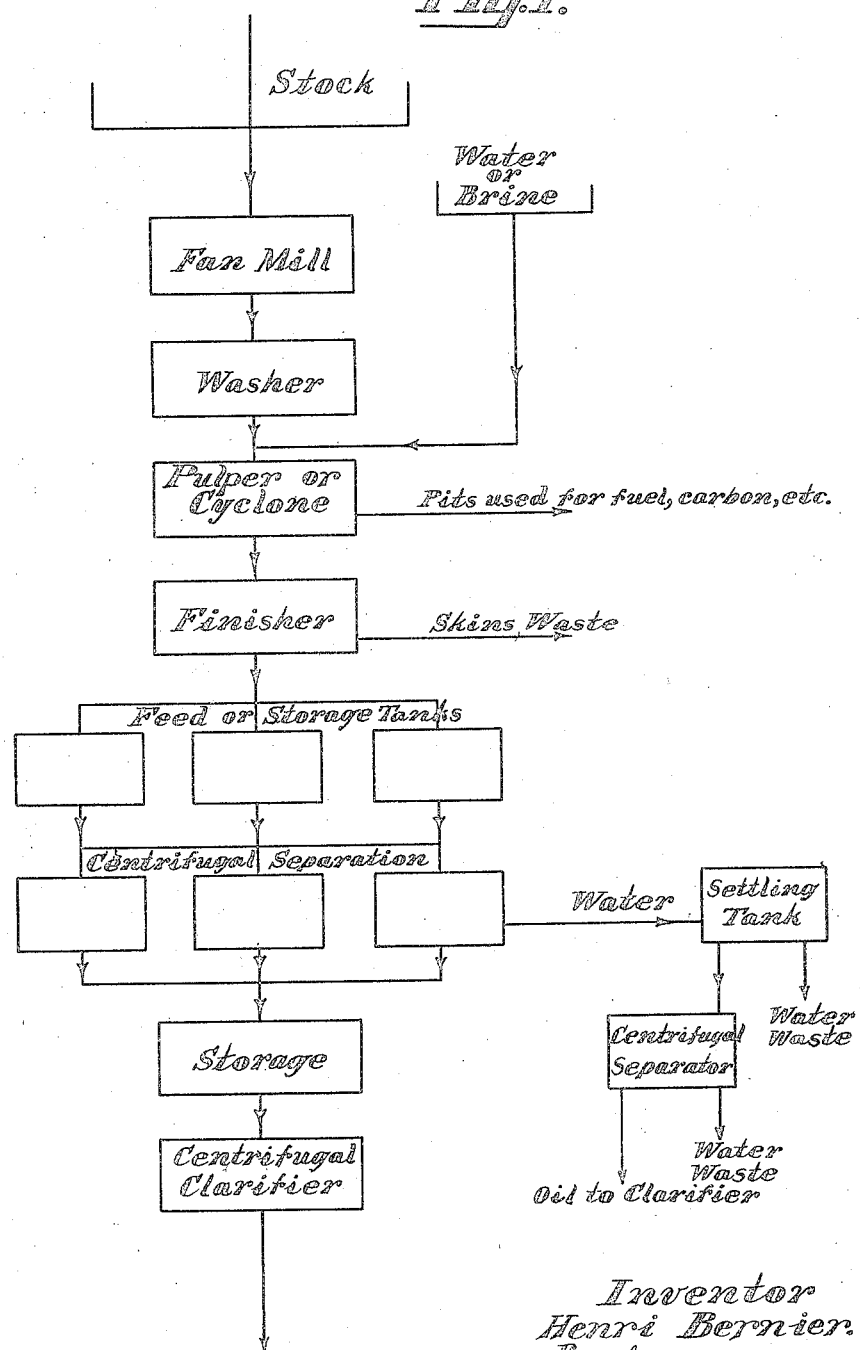

1,800,336

UNITED STATES PATENT OFFICE

HENRI BERNIER, OF OAKLAND, CALIFORNIA, ASSIGNOR TO CALIFORNIA PACKING CORPORATION, OF SAN FRANCISCO, CALIFORNIA, A CORPORATION OF NEW YORK

METHOD OF REMOVING OIL FROM OLIVES AND OTHER FRUITS

Application filed June 1, 1921. Serial No. 474,107.

This invention relates to a treatment of fruits to recover their oils, and particularly pertains to a method of removing oil from olives. Heretofore it has been common practice to obtain the oils from olives and other fruits by a long and involved method, which resulted in the production of numerous grades of oil obtained, of necessity at considerable expense; and it is the principal object of the present invention to provide a method of removing the oils from olives and other fruits by a substantially direct method which has eliminated the use of considerable of the machinery now required, and has resulted in a larger quantity of high grade oil being produced, thereby increasing the efficiency of the production of the plant and at the same time lowering the installation cost and the operating expense.

Fig. 1 is a flow plan illustrating in diagram a plant equipped to carry out the present invention.

Fig. 2 is a view in section and side elevation showing one form of device which may be used in finely dividing the pulp and separating it from its parts.

Fig. 3 is a view in transverse section through the device shown in Fig. 2, more clearly disclosing the pulping means.

At the present time it is general practice to produce olive oils by successively crushing the whole olives and pressing the liquids therefrom, whereby several grades of oils are recovered, running from first press oil to possibly fourth press oil, the first pressing being of the highest quality and the last pressing being only desirable for use in soaps and other technical purposes. These processes have, in the most instances, required the repeated handling of the pomace, accompanied by partial extraction of the oil at each handling. In carrying out the present invention, it is contemplated to first clean the fruit by passing it through an air blast where much of the less adherent and free foreign material will be removed. The fruit, such as olives, is then washed, after which the cleaned fruit is passed to a pulping apparatus, such as a cyclone mill. This mill is usually constructed with a circumscribing perforated wall serving the purpose of a colander and against which the olives are forcefully thrown by a series of rotating paddles. Such a device is shown in Figs. 2 and 3 of the drawing, where it will be seen that a horizontal cylinder 10 is provided. This cylinder is formed with a lower wall section of reticulated material as indicated at 11. Mounted within the cylinder and extending therethrough is a rotating shaft 12 carrying paddles or blades 13. These blades have their outer faces beveled and are positioned in close proximity to the inner cylindrical wall of the device. The outermost edges of the blades are spaced a distance from the wall sufficient to permit the seeds to pass between the blades and the wall without being crushed, at the same time shredding the fleshy portion of the fruit and forcing it through the screen. The pits are carried out through an opening 14 in the end of the cylinder by means of a screw conveyer 15. A highly satisfactory yield of oil has been obtained by employing both one-eighth and one-sixteenth diameter screen openings in the wall 11. This action will tend to force the pulp of the olives through the perforated wall and will finally result in a substantially complete separation of the pulpy portion of the olives from their pits. The pulp will then be in the form and consistency of a puree in which the oil bearing cells will all be ruptured as in contradistinction to present methods in which the fruit and possibly its pit, are ruptured or cracked without breaking down all of the cells and thus without freeing all of the oil. These pits may then be utilized as desired, attention being directed to the fact that the pits are not broken and that the oil resident within the pits will no have an opportunity to commingle with the oil obtained from the pulp, thus improving the quality of the oil obtained. In the event that the pulp or pomace is not of sufficient fineness and the cells ruptured it may be further acted upon by passing it through finer screens. The pomace thus prepared may be placed in vats or storage tanks and removed therefrom as required. When removed, this pulp is delivered to centrifugal separators in which the oil is separated from the remainder of the product. The oil may then be delivered into storage while the other matter is carried to a settling tank. The stored oil is thereafter treated as required.

It may be necessary to pass it through a centrifugal clarifier in addition to further filtration. However, when properly clarified and filtered it will be a high quality of uncontaminated oil. The water portion which was separated from the pomace and oil in the centrifugal separators is associated with a certain percentage of oil and, in fact, the liquid would be more properly termed an emulsion. The oil from this emulsion may be recovered in various ways, the most practical being to heat the emulsion and thereafter add a desired amount of acid. This will break down the emulsion and permit the oil to be skimmed off. This process will thus result in two grades of oil in contradistinction to the present processes which usually produce four or more grades, varying successively in quality. The present process insures that a large proportion of very high quality oil will be produced and a small proportion of lower quality oil will be obtained. As the quality of the oil recovered is to a considerable extent dependent upon the length of time required to complete its recovery, it is evident that the decreased number of operations necessary in this process, will provide a much greater proportion of first quality oil.

Having thus described my method, what I claim and desire to secure by Letters Patent is:

1. A process of extracting oil from olives comprising, separating the fleshy portion of olives from the pits, rupturing the cells of said fleshy portion so as to form a fluid pulp having the form and consistency of a puree without the addition of water thereto, and removing a large portion of the oil from the pulp by centrifugal action.

2. A process of extracting oil from olives comprising forcing oil bearing constituents of olives through perforations sufficiently small to form a pulp having the form and consistency of puree without the addition of water thereto, and removing oil from the pulp by centrifugal action.

3. A process of extracting oil from olives comprising forcing oil bearing constituents of olives through perforations sufficiently small to form a pulp having the form and consistency of puree, and removing oil from the pulp by centrifugal action.

HENRI BERNIER.